United States Patent
Downs

(10) Patent No.: US 11,273,695 B2
(45) Date of Patent: Mar. 15, 2022

(54) HYBRID AXLE ASSEMBLY HAVING INSIDE OUT MOTOR AND RING GEAR DIRECTLY SUPPORTED ON AN AXLE HOUSING

(71) Applicant: AMERICAN AXLE & MANUFACTURING, INC., Detroit, MI (US)

(72) Inventor: James P. Downs, South Lyon, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 16/951,166

(22) Filed: Nov. 18, 2020

(65) Prior Publication Data

US 2021/0078398 A1    Mar. 18, 2021

Related U.S. Application Data

(63) Continuation of application No. PCT/US2019/029091, filed on Apr. 15, 2019.

(60) Provisional application No. 62/681,937, filed on Jun. 14, 2018.

(51) Int. Cl.
*B60K 1/00* (2006.01)
*B60K 17/16* (2006.01)
*H02K 7/116* (2006.01)

(52) U.S. Cl.
CPC ............... *B60K 1/00* (2013.01); *B60K 17/16* (2013.01); *B60K 2001/001* (2013.01); *B60Y 2400/73* (2013.01); *H02K 7/116* (2013.01)

(58) Field of Classification Search
USPC ....................................................... 475/339
See application file for complete search history.

(56) References Cited

U.S. PATENT DOCUMENTS

| | | | | |
|---|---|---|---|---|
| 4,467,230 A | * | 8/1984 | Rovinsky ............... | H02K 7/116 310/266 |
| 5,692,989 A | * | 12/1997 | Kamlukin ................ | F16H 1/28 475/338 |
| 5,759,128 A | * | 6/1998 | Mizutani ................ | H02K 7/116 475/149 |

(Continued)

FOREIGN PATENT DOCUMENTS

| | | | | |
|---|---|---|---|---|
| DE | 102005062781 A1 | * | 7/2007 | ............... H02K 1/32 |
| DE | 102016210461 A1 | * | 12/2017 | ........... B60K 17/165 |

OTHER PUBLICATIONS

International Search Report for International Application PCT/US2019/029091, dated Sep. 11, 2019.

(Continued)

*Primary Examiner* — Dirk Wright
(74) *Attorney, Agent, or Firm* — Burris Law, PLLC

(57) ABSTRACT

A hybrid axle assembly that includes a housing assembly, a differential assembly received in the housing assembly, and an inside-out motor. The differential assembly is rotatable about a differential axis and has a differential input and a pair of differential outputs. The inside-out motor has a stator, which is fixedly coupled to the housing, and a rotor. The stator is disposed circumferentially about the differential input. The rotor is disposed circumferentially about the stator such that the stator is disposed radially between the differential input and the rotor. The rotor is drivingly coupled to the differential input.

19 Claims, 3 Drawing Sheets

(56) References Cited

U.S. PATENT DOCUMENTS

| | | | |
|---|---|---|---|
| 6,705,970 B2* | 3/2004 | Kakeno | F16H 1/28 475/339 |
| 7,316,627 B2* | 1/2008 | Bennett | B60L 3/0061 475/149 |
| 7,452,301 B2 | 11/2008 | Yoshioka | |
| 7,588,508 B2 | 9/2009 | Marsh et al. | |
| 8,529,397 B2* | 9/2013 | Demtroder | F16H 1/28 475/331 |
| 8,562,470 B2* | 10/2013 | Yang | F16H 3/724 475/9 |
| 8,663,051 B2 | 3/2014 | Sten | |
| 8,727,934 B2* | 5/2014 | Roussey | F16H 1/2863 475/339 |
| 8,992,367 B2* | 3/2015 | Kalmbach | H02K 7/116 475/150 |
| 9,011,285 B2* | 4/2015 | Markl | B60K 17/16 475/150 |
| 9,255,633 B2* | 2/2016 | Markl | B60K 7/0007 |
| 9,500,267 B2 | 11/2016 | Hederstad et al. | |
| 9,637,022 B2 | 5/2017 | Gavling et al. | |
| 9,777,818 B2 | 10/2017 | Valente et al. | |
| 9,783,035 B1 | 10/2017 | Huang et al. | |
| 9,958,049 B1 | 5/2018 | Sten et al. | |
| 10,006,533 B1 | 6/2018 | Strandberg | |
| 10,525,810 B2 | 1/2020 | Jegebris et al. | |
| 10,675,984 B2 | 6/2020 | Ronning et al. | |
| 2003/0015359 A1* | 1/2003 | Hanscombe | H02K 7/116 180/65.6 |
| 2005/0034906 A1* | 2/2005 | Liao | B62B 5/0026 180/65.6 |
| 2005/0211490 A1* | 9/2005 | Shimizu | B60L 50/15 180/243 |
| 2011/0061956 A1 | 3/2011 | Gilmore et al. | |
| 2012/0129644 A1* | 5/2012 | Palfai | H02K 7/006 475/150 |
| 2013/0123057 A1 | 5/2013 | Markl | |
| 2017/0198799 A1 | 7/2017 | Downs et al. | |
| 2018/0029471 A1 | 2/2018 | Richards et al. | |
| 2018/0257485 A1* | 9/2018 | Vincon | B60K 17/24 |
| 2021/0006113 A1* | 1/2021 | Lassila | H02K 1/2786 |

OTHER PUBLICATIONS

Written Opinion for International Application PCT/US2019/029091, dated Sep. 11, 2019.

\* cited by examiner

HYBRID AXLE ASSEMBLY HAVING INSIDE OUT MOTOR AND RING GEAR DIRECTLY SUPPORTED ON AN AXLE HOUSING

CROSS-REFERENCE TO RELATED APPLICATIONS

This application is a (bypass) continuation of International Application No. PCT/US2019/029091 filed Apr. 25, 2019, which claims the benefit of U.S. Provisional Application No. 62/684,937, filed on Jun. 14, 2018. Each of the above-referenced application is incorporated by reference as if fully set forth in detail herein.

FIELD

The present disclosure relates to a hybrid axle assembly having an inside out motor and ring gear directly supported on an axle housing.

BACKGROUND

This section provides background information related to the present disclosure which is not necessarily prior art.

Hybrid axle assemblies are increasingly popular in modern automotive vehicles. Despite their increasing popularity, such devices are susceptible to improvement, for example to incorporate a two-speed transmissions between an electric motor and a differential assembly, to render he hybrid axle assembly easier to incorporate into a vehicle, and/or to increase the power-to-weight ratio of the hybrid axle assembly.

SUMMARY

This section provides a general summary of the disclosure, and is not a comprehensive disclosure of its full scope or all of its features.

In one form, the present disclosure provides a hybrid axle assembly that includes a housing assembly, a differential assembly received in the housing assembly, and an inside-out motor. The differential assembly is rotatable about a differential axis and has a differential input and a pair of differential outputs. The inside-out motor has a stator, which is fixedly coupled to the housing, and a rotor. The stator is disposed circumferentially about the differential input. The rotor is disposed circumferentially about the stator such that the stator is disposed radially between the differential input and the rotor. The rotor is drivingly coupled to the differential input.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
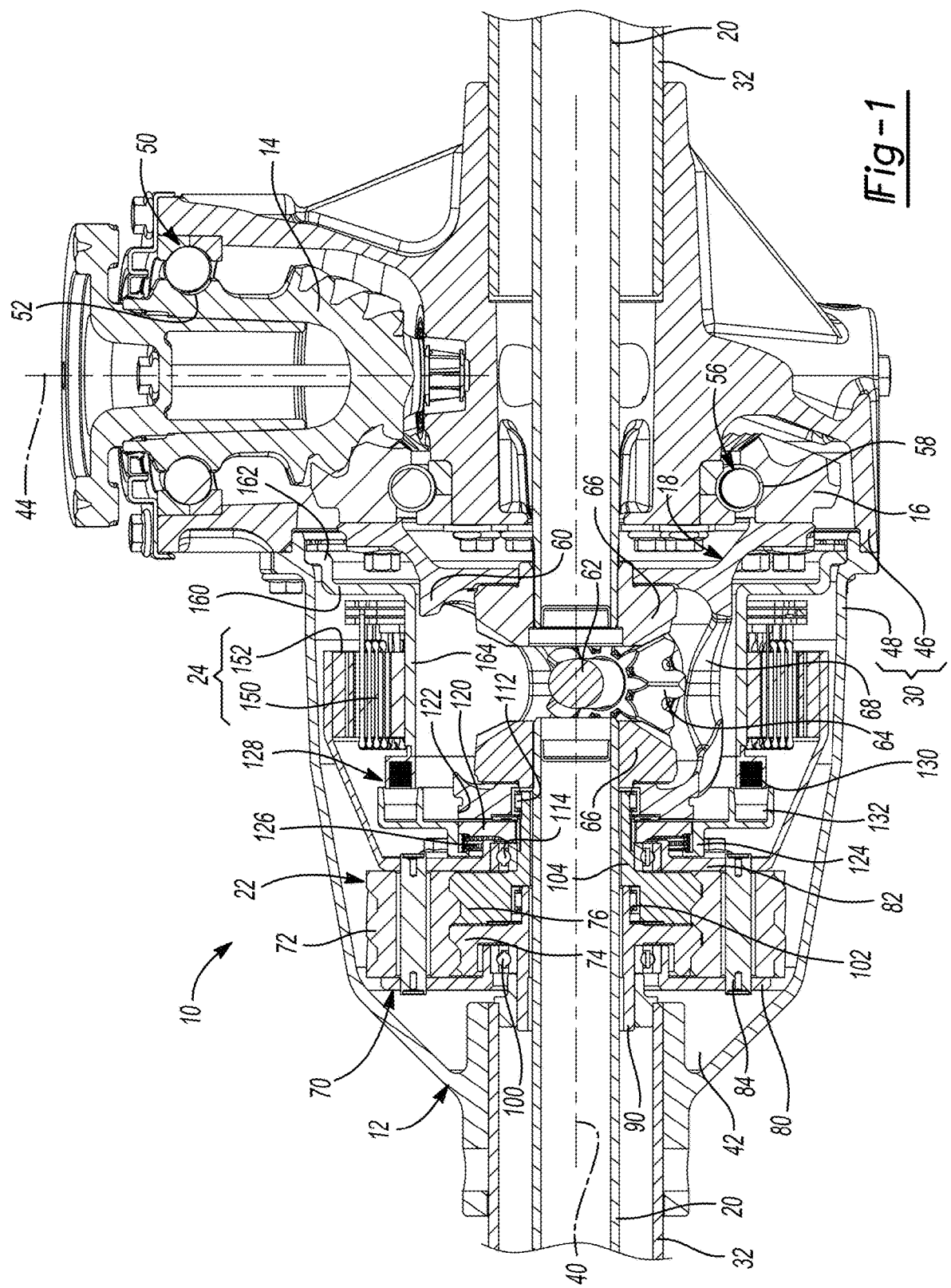
FIG. 1 is a lateral cross-section of an exemplary hybrid axle assembly constructed in accordance with the teachings of the present disclosure.
Figure 2:
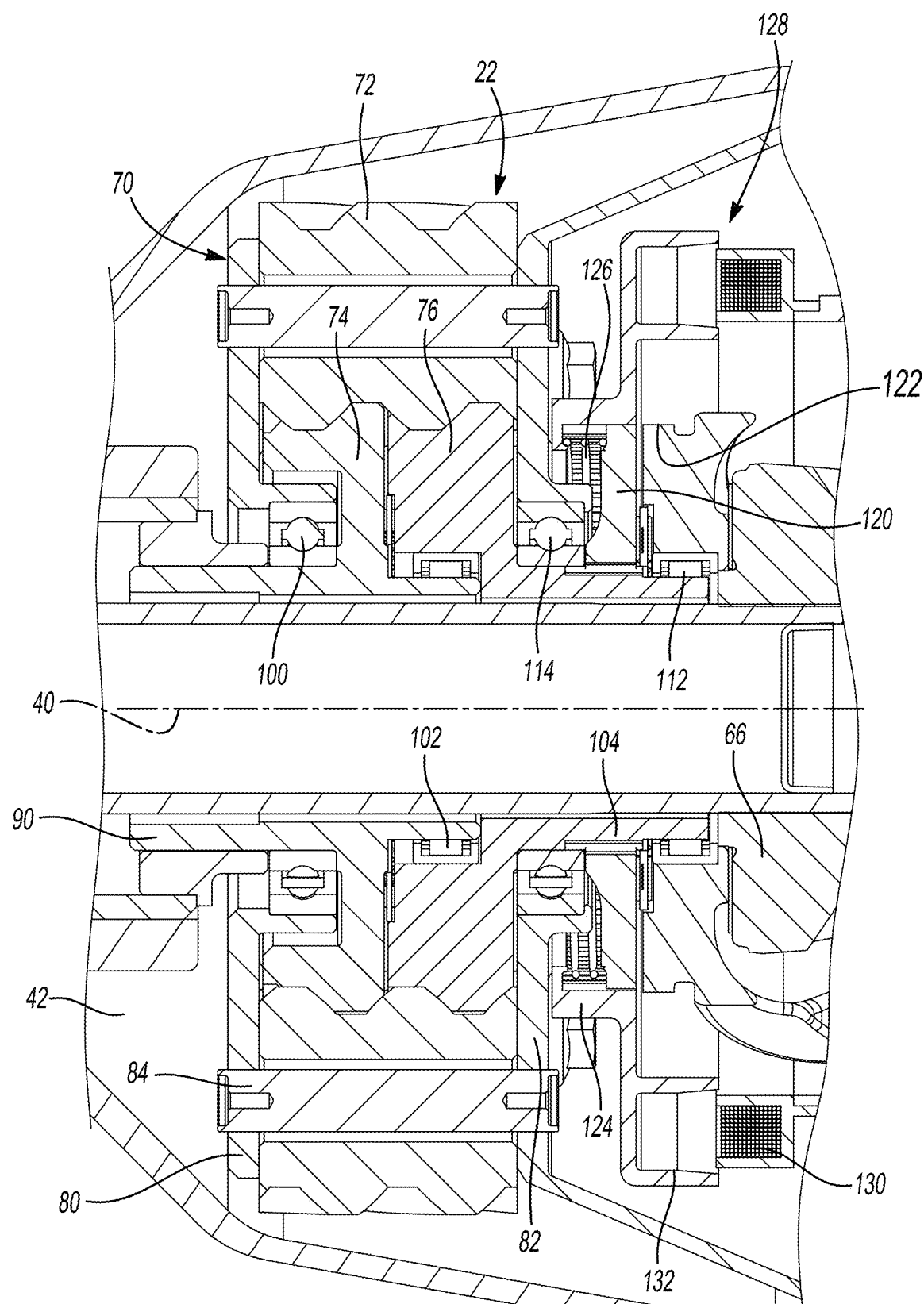
FIG. 2 is an enlarged portion of FIG. 1.
Figure 3:
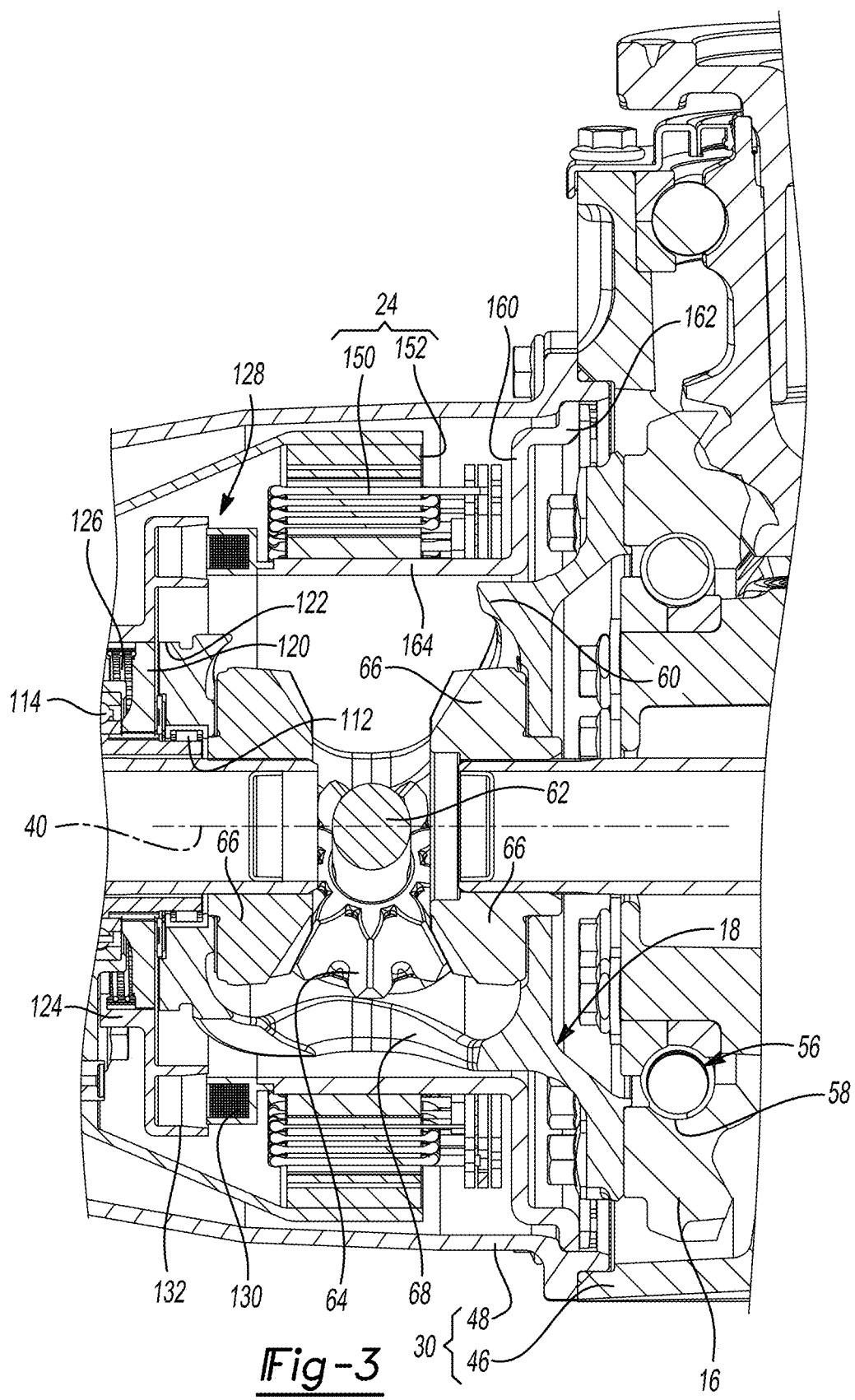
FIG. 3 is an enlarged portion of FIG. 1.

With reference to FIGS. 1-3 of the drawings, an exemplary hybrid axle assembly constructed in accordance with the teachings of the present disclosure is generally indicated by reference numeral 10. In the example illustrated, the hybrid axle assembly 10 is a beam axle, but it will be appreciated that the hybrid axle assembly 10 could be configured as an independently suspended drive module. The hybrid axle assembly 10 can include an axle housing assembly 12, an input pinion 14, a ring gear 16, a differential assembly 18, a pair of output shafts 20, a transmission 22 and an electric motor 24.

The axle housing assembly 12 can include a carrier housing assembly 30 and a pair of axle tubes 32. The carrier housing assembly 30 can define a differential axis 40, an internal cavity 42, which is disposed about the differential axis 40, and a pinion axis 44 that can be transverse to the differential axis 40. In the example provided, the carrier housing assembly 30 includes first and second housing members 46 and 48 that are separable from one another along the differential axis 40. The first and second housing members 46 and 48 can define tube bores into which a respective one of the axle tubes 32 can be received.

The input pinion 14 can be received in the internal cavity 42 and can be supported by the first housing member 46 for rotation about the pinion axis 44. In the example provided, the input pinion 14 is supported relative to the first housing member 46 via a four-point angular contact bearing 50. Optionally, an inner bearing race 52 of the four-point angular contact bearing 50 can be unitarily and integrally formed with the input pinion 14.

The ring gear 16 can be received in the internal cavity 42 and can be supported by the carrier housing assembly 30 for rotation about the differential axis 40. In the example provided, the ring gear 16 is supported relative to the first housing member 46 by a four-point angular contact bearing 56, and an outer bearing race 58 of the four-point angular contact bearing 56 is unitarily and integrally formed with the ring gear 16.

The differential assembly 18 can be constructed in various different ways and can include, for example, a spur planetary gear configuration, a helical gear configuration, a spool with one or more clutches, or a straight bevel gear configuration. In the example provided, the differential assembly 18 has a straight bevel gear configuration and includes a differential case 60, which serves as the differential input of the differential assembly, a cross-pin 62, a plurality of differential pinions 64 (only one shown), and a pair of side gears 66, which serve as the differential outputs of the differential assembly. The differential case 60 defines a case cavity 68 and is fixedly coupled to the ring gear 16 for rotation there with about the differential axis 40. The cross-pin 62 can be fixedly coupled to the differential case 60 and can extend through the case cavity 68 perpendicular to the differential axis 40. Each of the differential pinions 64 can be rotatably received onto the cross-pin 62. Each of the side gears 66 can be disposed in the case cavity 68 for rotation about the differential axis 40 and can be meshingly engaged with the differential pinions 64.

Each of the output shafts 20 is non-rotatably coupled to an associated one of the side gears 66. Each of the output shafts 20 can extend through an associated one of the axle tubes 32.

The transmission 22 is configured to transmit rotary power from the electric motor 24 to the differential case 60 and can be configured in any desired manner. In the example provided, the transmission 22 has a planetary configuration with a planet carrier 70, a plurality of planet gears 72, a first sun gear 74, and second sun gear 76. The planet carrier 70 includes first and second end plates 80 and 82, respectively, and a plurality of pins 84 that are fixedly coupled to and extend between the first and second end plates 80 and 82. Each of the planet gears 72 can be rotatably disposed on an associated one of the pins 84 and received axially between the first and second end plates 80 and 82. The first sun gear 74 can be fixedly coupled to the axle housing assembly 12 and can be meshingly engaged with the planet gears 72. In the example provided, the first sun gear 74 includes a tubular foot 90 that is disposed concentrically about the differential axis 40 and non-rotatably but axially slidably engaged to the axle housing assembly 12. A first bearing 100 can be received between the first end plate 80 and the tubular foot 90 of the first sun gear 74 to support the planet carrier 70 for rotation about the differential axis 40. The second sun gear 76 can be meshingly engaged with the planet gears 72 and is rotatable about the differential axis 40 relative to the axle housing assembly 12 and the differential case 60. A first needle bearing 102 can be disposed between the second sun gear 76 and the foot 90 of the first sun gear 74 to support the second sun gear 76 for rotation relative to the first sun gear 74. A connector sleeve 104 can be fixedly coupled to the second sun gear 76 and can be received into the differential case 60. The connector sleeve 104 could be coupled to the differential case 60 for common rotation, but in the example provided, a clutch is employed to selectively couple the connector sleeve 104 to the differential case 60. A second needle bearing 112 can be disposed between the connector sleeve 104 and the differential case 60 and can support the connector sleeve 104 (and the second sun gear 76) for rotation about the differential axis 40 relative to the differential case 60. A second bearing 114 can be received between the connector sleeve 104 and the second end plate 82 to support the planet carrier 70 for rotation about the differential axis 40 relative to the second sun gear 76 and connector sleeve 104.

The clutch can include a first clutch member 120, which can be coupled to the connector sleeve 104 for rotation therewith, a second clutch member 122, which can consist of teeth that are coupled to the differential case 60 for rotation therewith, a movable clutch member 124, which is non-rotatably but axially slidably coupled to one of the first and second clutch members 120 and 122, a return spring 126, and a linear motor 128. In the example provided, each of the first and second clutch members 120 and 122 has a plurality of external spline teeth, and the movable clutch member 124 has internal spline teeth that are engagable to the external spline teeth on the first and second clutch members 120 and 122. It will be appreciated that movable clutch member 124 can be moved along the differential axis 40 between a first position, in which the internal spline teeth of the movable clutch member 124 are engaged to the external spline teeth of only one of the first and second clutch members 120 and 122 to thereby permit relative rotation between the connector sleeve 104 and the differential case 60, and a second position in which the internal spline teeth of the movable clutch member 124 are engaged to the external spline teeth of both the first and second clutch members 120 and 122 to thereby inhibit relative rotation between the connector sleeve 104 and the differential case 60. The return spring 126 can bias the movable clutch member 124 into one of the first and second positions, and the linear motor 128 can be employed to selectively move the movable clutch member 124 from the one of the first and second positions to the other one of the first and second positions. In the example provided, the return spring 126 is configured to bias the movable clutch member 124 into the first position and the linear motor 128 is selectively operable for moving the movable clutch member 124 from the first position to the second position. The linear motor 128 can be any type of linear motor, such as an annular solenoid having an electromagnet 130, which is fixedly coupled to the axle housing assembly 12, and an armature 132 that is fixedly coupled to the movable clutch member 124. A thrust bearing can be received between the first clutch member 120 and the differential case 60.

The electric motor 24 can include a stator 150, which can be fixedly coupled to the axle housing assembly 12, and a rotor 152 that can be rotatable about the differential axis 40. In the example provided, the electric motor 24 is an inside-out motor in which the rotor 152 is disposed radially outwardly of the stator 150 to reduce the overall size of the hybrid axle assembly 10 due to the compactness of the electric motor 24. The stator 150 can be mounted to a stator mount 160 that can have a housing mount portion 162, which can be fixedly coupled to the axle housing assembly 12, and a stator mount portion 164 that can extend circumferentially about the differential case 60. The stator 150 can be fixedly coupled to the stator mount portion 164. The rotor 152 can be coupled to the planet carrier 70 for common rotation about the differential axis 40.

The hybrid axle assembly 10 can be operated in a first drive mode in which rotary power is provided to the input pinion 14 to drive the ring gear 16 and the differential case 60. Rotary power provided to the differential case 60 is distributed by the differential pinions 64 and the side gears 66 to drive the output shafts 20. Electric power is not provided to the electromagnet 130 in this mode so that the return spring 126 urges the movable clutch member 124 into the first position so that the differential case 60 is rotationally decoupled from the second sun gear 76 so that the rotor 152 is not driven about the differential axis 40 (i.e., the rotor 152 can be maintained in a non-rotating state when the hybrid axle assembly 10 is operated in the first drive mode).

Alternatively, the hybrid axle assembly 10 can be operated in a second drive mode in which the linear motor 128 is employed to position the movable clutch member 124 in the second position and the electric motor 24 is operated to provide rotary power to the planet carrier 70, which is the input of the transmission 22 in the example provided. Rotary power input to the planet carrier 70 drives the planet carrier 70 about the differential axis 40 causes the transmission 22 to output rotary power through the second sun gear 76/connector sleeve 104. With the movable clutch member 124 positioned in the second position to thereby rotatably couple the first and second clutch members 120 and 122 with one another, rotary power is transmitted from the connector sleeve 104 through the clutch and into the differential case 60. Rotary power provided to the differential case 60 is distributed by the differential pinions 64 and the side gears 66 to drive the output shafts 20.

It will be appreciated that the inside-out configuration of the electric motor 24 and the configuration of the housing assembly 12, input pinion 14, ring gear 16, four-point angular contact bearing 50 and ring gear bearing 56 provide the hybrid axle assembly 10 with a relatively higher power-to-weight ratio than a conventionally configured hybrid axle assembly that is configured with a conventional electric motor configuration (i.e., a rotor that is disposed within a stator) and a conventional axle arrangement in which the input pinion and differential assembly are supported by pairs of tapered roller bearings).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A hybrid axle assembly comprising:
   a housing assembly;
   a differential assembly received in the housing assembly, the differential assembly being rotatable about a differential axis and having a differential input and a pair of differential outputs;
   an inside-out motor having a stator, which is fixedly coupled to the housing assembly, and a rotor, the stator being disposed circumferentially about the differential input, the rotor being disposed circumferentially about the stator such that the stator is disposed radially between the differential input and the rotor;
   a transmission having a transmission input member, which is coupled to the rotor for rotation therewith, and a transmission output, wherein the transmission is a planetary transmission having a first sun gear, which is non-rotatably coupled to the housing assembly, a second sun gear, which is rotatable about the differential axis, a plurality of planet gears, which are meshingly engaged to the first and second sun gears, and a planet carrier that supports the planet gears, wherein the transmission input member is the planet carrier, and wherein the transmission output is the second sun gear; and
   a clutch having a clutch input, which is coupled for rotation with the second sun gear, and a clutch output that is coupled to the differential input for rotation therewith.

2. The hybrid axle assembly of claim 1, wherein the differential input is a differential case.

3. The hybrid axle assembly of claim 2, wherein the differential assembly further comprises a differential gearset received in the differential case, and wherein the differential outputs comprise side gears in the differential gearset.

4. The hybrid axle assembly of claim 1, wherein the clutch includes a movable clutch member that is movable between a first position, in which the clutch input and the clutch output are rotatable relative to one another, and a second position in which the clutch input and the clutch output are coupled to one another for common rotation.

5. The hybrid axle assembly of claim 4, further comprising a linear motor for selectively moving the movable clutch member.

6. The hybrid axle assembly of claim 5, wherein the linear motor comprises a solenoid having an electromagnet and an armature, the electromagnet having an annular configuration and being disposed about the differential input.

7. The hybrid axle assembly of claim 1, further comprising an input pinion and a ring gear, the input pinion being received in the housing assembly and being rotatable about a pinion axis that is transverse to the differential axis, the ring gear being coupled to the differential input for common rotation and being meshingly engaged by the input pinion.

8. The hybrid axle assembly of claim 7, wherein a ring gear bearing is received directly between the ring gear and the housing assembly.

9. The hybrid axle assembly of claim 8, wherein a bearing race of the ring gear bearing is unitarily and integrally formed with the ring gear.

10. The hybrid axle assembly of claim 8, wherein a four-point angular contact bearing is received directly between the input pinion and the housing assembly.

11. The hybrid axle assembly of claim 10, wherein a bearing race of the four-point angular contact bearing is unitarily and integrally formed with the input pinion.

12. A hybrid axle assembly comprising:
    a housing assembly;
    a differential assembly received in the housing assembly, the differential assembly having a differential input, which is rotatable about a differential axis, and first and second differential outputs that are rotatable relative to the differential input about the differential axis;
    a first output shaft coupled to the first differential output for rotation therewith;
    a second output shaft coupled to the second differential output for rotation therewith;
    an inside-out motor having a stator and a rotor, the stator being disposed circumferentially about the differential input, the rotor being disposed circumferentially about the stator such that the stator is disposed radially between the differential input and the rotor, the rotor being rotatable about the differential axis;
    a transmission having a transmission input member, which is coupled to the rotor for rotation therewith, and a transmission output that is drivingly coupled to the differential input, wherein the transmission is a planetary transmission having a first sun gear, which is non-rotatably coupled to the housing assembly, a second sun gear, which is rotatable about the differential axis, a plurality of planet gears, which are meshingly engaged to the first and second sun gears, and a planet carrier that supports the planet gears, wherein the transmission input member is the planet carrier, and wherein the transmission output is the second sun gear and wherein the first output shaft extends through the first and second sun gears.

13. The hybrid axle assembly of claim 12, wherein the differential input is a differential case.

14. The hybrid axle assembly of claim 13, wherein the differential assembly further comprises a differential gearset received in the differential case, and wherein the first and second differential outputs comprise side gears in the differential gearset.

15. The hybrid axle assembly of claim 12, further comprising an input pinion and a ring gear, the input pinion being received in the housing assembly and being rotatable about a pinion axis that is transverse to the differential axis, the ring gear being coupled to the differential input for common rotation and being meshingly engaged by the input pinion.

16. The hybrid axle assembly of claim 15, wherein a ring gear bearing is received directly between the ring gear and the housing assembly.

17. The hybrid axle assembly of claim 16, wherein a bearing race of the ring gear bearing is unitarily and integrally formed with the ring gear.

18. The hybrid axle assembly of claim 16, wherein a four-point angular contact bearing is received directly between the input pinion and the housing assembly.

19. The hybrid axle assembly of claim 18, wherein a bearing race of the four-point angular contact bearing is unitarily and integrally formed with the input pinion.

* * * * *